UNITED STATES PATENT OFFICE.

HERMANN KASERER, OF VIENNA, AUSTRIA-HUNGARY.

PROCESS OF CLEARING FLUIDS CONTAINING FREE ACIDS OR ACID SALTS.

SPECIFICATION forming part of Letters Patent No. 713,646, dated November 18, 1902.

Application filed October 9, 1900. Serial No. 32,540. (No specimens.)

*To all whom it may concern:*

Be it known that I, HERMANN KASERER, a subject of the Emperor of Austria-Hungary, residing at Vienna, Empire of Austria-Hungary, have invented a certain new and useful Process of Clearing Fluids Containing Free Acid Salts, of which the following is a full, clear, and exact description.

The present invention consists of a process for clearing fluids containing free acids or acid salts—such, for instance, as grape and fruit wines, beer, vinegar, spirituous mixtures, brandy, and other alcoholic liquors.

The process consists, substantially, in mixing with the liquid to be cleared a casein compound decomposable by means of free acids or acid salts.

The casein compound is decomposed by the free acids or acid salts, so that the freed casein is separated out in the form of a fine amorphous precipitate, taking with it to the bottom all the particles which render the fluid turbid or clouded.

The effect produced by the casein is not influenced in any way by the presence of tannic acid, since in this case an insoluble tannic-acid-casein compound is formed which carries down the particles, rendering the liquid turbid with it, forming a deposit at the bottom.

The deacidification of the liquor caused by the process is very slight and does not in any way affect the quality of the liquid.

The deposit is eliminated from the liquid by filtration or decantation or a suitable combination of the two processes in the known manner.

The casein compounds most advantageously employed in carrying out the present process are those of casein with potassium, sodium, and calcium.

By preference the sodium compound of casein is employed, which is soluble in water and is used in the form of an aqueous solution. The process is carried out by adding to the fluid to be cleared a solution of the casein compound in water as concentrated as possible. The exact amount to be added depends upon the degree of turbidity of the liquid to be cleared and varies within considerable limits. In the case of a concentrated solution of the casein-sodium compound in water one-fourth per cent. to five per cent. of the amount of the fluid to be treated should be added. Thus, for instance, in order to clear one hundred liters of beer or wine ten grams of casein with the addition of a small quantity of soda is dissolved in one hundred to two hundred grams of water, then about five liters of the wine or beer to be cleared are poured into a receptacle, and the casein solution above mentioned is gradually added, the whole being constantly stirred. It will then be found that the casein will be precipitated out in the form of fine flakes. Before these flakes are allowed to settle down the five liters thus treated are returned or poured back into the remaining ninety-five liters, then thoroughly mixed and allowed to stand for several days. The cleared fluid is then drawn off from the sediment.

I claim as my invention—

A process for clearing liquors of the class specified which consists substantially in adding to the said liquor a suitable quantity of a casein compound decomposable by free acids or acid salts and subsequently eliminating the precipitate from the liquor in the manner substantially as described.

In witness whereof I have hereunto set my hand in presence of two witnesses.

HERMANN KASERER.

Witnesses:
    FRIEDRICH BRINDER,
    ALVESTO S. HOGUE.